United States Patent
Dryer et al.

(10) Patent No.: US 9,076,044 B2
(45) Date of Patent: Jul. 7, 2015

(54) APPARATUS AND METHOD FOR MONITORING HAND WASHING

(71) Applicants: Joseph Ernest Dryer, Houston, TX (US); John David Lambert, Katy, TX (US); Ian James Lambert, Houston, TX (US)

(72) Inventors: Joseph Ernest Dryer, Houston, TX (US); John David Lambert, Katy, TX (US); Ian James Lambert, Houston, TX (US)

( * ) Notice: Subject to any disclaimer, the term of this patent is extended or adjusted under 35 U.S.C. 154(b) by 156 days.

(21) Appl. No.: 13/716,101

(22) Filed: Dec. 15, 2012

(65) Prior Publication Data

US 2014/0169622 A1    Jun. 19, 2014

(51) Int. Cl.
G06K 9/00    (2006.01)

(52) U.S. Cl.
CPC .................................. G06K 9/00771 (2013.01)

(58) Field of Classification Search
CPC ........................................................ G06K 9/00
USPC ........................................................ 382/103
See application file for complete search history.

(56) References Cited

U.S. PATENT DOCUMENTS

| | | | | |
|---|---|---|---|---|
| 6,038,331 | A * | 3/2000 | Johnson | 382/100 |
| 6,375,038 | B1 * | 4/2002 | Daansen et al. | 222/52 |
| 2007/0195165 | A1 * | 8/2007 | Hirakawa | 348/75 |
| 2008/0024599 | A1 * | 1/2008 | Hirakawa | 348/65 |
| 2008/0250152 | A1 * | 10/2008 | Chou | 709/230 |
| 2009/0087028 | A1 * | 4/2009 | Lacey et al. | 382/103 |
| 2010/0134296 | A1 * | 6/2010 | Hwang | 340/573.1 |

* cited by examiner

*Primary Examiner* — Stephen R Koziol
*Assistant Examiner* — Delomia Gilliard

(57) ABSTRACT

A method and apparatus to monitor and document that proper hygienic procedures are followed by food service providers consisting of a camera, a processor controlling the camera, and software to accomplish the hand washing monitoring. The criteria for identifying the start and end of a hand washing event by monitoring activity is selected areas is presented. A record is created of the wash event including a sequence of photograph during the event and additional related data such as start time, duration, location, and any employee identification. This record is available for recording or downloading to a server for further manipulation, including washer identification and statistical analysis.

16 Claims, 1 Drawing Sheet

System handling of image input

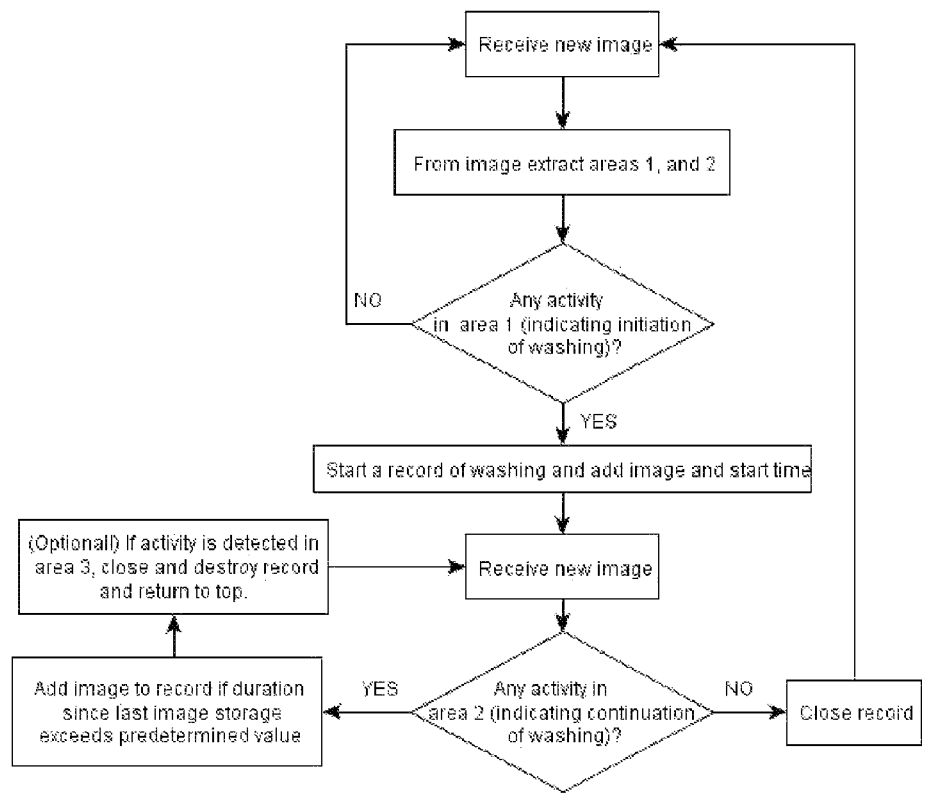
System handling of image input

APPARATUS AND METHOD FOR MONITORING HAND WASHING

CROSS-REFERENCE TO RELATED APPLICATIONS none

FEDERALLY SPONSORED RESEARCH

None.

SEQUENCE LISTING

None.

BACKGROUND

Prior Art

The following is a tabulation of some prior art that presently appears relevant:

| U.S. Patents | | | |
| --- | --- | --- | --- |
| Patent Number | Kind Code | Issue Date | Patentee |
| 6,038,331 | B1 | Mar. 14, 2000 | Johnson |
| 6,577,240 | B1 | Jun. 10, 2003 | Armstrong |
| 6,970,574 | B1 | Nov. 29, 2005 | Johnson |
| 7,248,933 | B1 | Jul. 24, 2007 | Wildman |
| 7,372,367 | B1 | May 13, 2008 | Lane, et al. |
| 7,597,122 | B1 | Oct. 6, 2009 | Smith |
| 7,542,586 | B1 | Jun. 2, 2009 | Johnson |
| 7,755,494 | B1 | Jul. 13, 2010 | Melker, et al. |
| 8,090,155 | B1 | Jan. 3, 2012 | Lacey, et al. |
| 8,237,558 | B1 | Aug. 7, 2012 | Seyed Momen, et al. |
| 8,294,584 | B1 | Oct. 23, 2012 | Plost |
| 8,299,896 | B1 | Oct. 30, 2012 | Mahmoodi, et al. |

| U.S. Patent Application Publications | | | |
| --- | --- | --- | --- |
| Publication Nr. | Kind Code | Publ. Date | Applicant |
| 20090087028 | A1 | Apr. 2, 2009 | Lacey et al. |
| 20100155416 | A1 | Jun. 24, 2010 | Johnson; Raymond C |
| 20120062382 | A1 | Mar. 15, 2012 | Taneff |
| 20120140054 | A1 | Jun. 7, 2012 | Chen; Wen-Hui; et al. |

BACKGROUND

Facilities such as restaurants, food packaging and pharmaceutical factories which process items where contamination from human contact is to be avoided have locations where hand washing is to be publically observable for monitoring and oversight. There is also a need at medical facilities and hospitals to assure that hygienic hand washing practices are followed. In the following discussions the locations will be referred to as wash stations. The actual practice of washing of hands in the following discussions will be referred to as a hand washing event. There are standards as to when and in what situations and in what manner the hands are to be washed. For example in the restaurant industry hands are to be washed after contact with raw food for at least 15 seconds of vigorous scrubbing. Government surveys have found up to 50% noncompliance with proper hand washing guidelines by restaurant employees. This has led to several epidemics, such as the 1992 Jack-in-the-Box outbreak where more than 500 people developed E. coli infections and four children died. This had serious effects on Jack-in-the-Box's business nationally and exposed them to serious lawsuits. Most establishments have standards for the employee hand washing and provide training and signs promoting good practices, but studies show this is ineffective and provides no documentation of compliance. The proposed system addresses the industry need for a system to facilitate management overview of hygienic practices, and allow documented proof that good practices are being followed.

Many food service establishments rely on employee sign-up sheets, third-party visiting audits or management observations to insure hand washing compliance, all of which suffer from infrequent observations and unverified reports. Commercial systems to monitor employee hand washing compliance operate on the principle of RFID identification of employees and some interface with the washing station to monitor and document compliance. This is expensive and prone to abuse, e.g. employee swapping of the RFID tags.

As a measure of the importance of this problem a number of patents have been issued on various aspects of the problem. The following addresses some of the prior art and the differences between previous approaches and the current invention.

The application by Johnson (20100155416) monitors hand washing by a with a soap dispenser, which is not a requirement of the present invention.

The application and patent by Lacey (20090087028 and U.S. Pat. No. 8,090,155) involve a detailed evaluation of the hand motion and provides no means of subject identification, unlike the present invention.

In the application of Taneff (20120062382) the system uses RFID(s) (Radio Frequency Identification Unit) communicating with other electronic units through the use of RF waves in order to achieve its main objective, which is not a requirement of the present invention.

Armstrong's patent (U.S. Pat. No. 6,577,240) queues detection of a hand washing alarm depending on the detection of persons passing through areas. The current invention involves no detection of persons passing through an area.

In Wildman's patent (U.S. Pat. No. 7,248,933) the cameras are not used as sensors as in the case of Argus. Independent claims are 1, 44, 68 and 86. Claim 1 has user ID badges and the others have the equivalent of "means respectively coupled to a plurality of objects for transmitting unique transmitter IDs" requiring the user to transmit. Limited to the health care environment.

The patent by Lane et al. (U.S. Pat. No. 7,372,367) requires movement from zone to zone and the pressing of a switch unlike the current invention. There are numerous other patients addressing the movement of people from zone to zone that are not referenced as this is not the purpose of or utilizes the techniques of the current patent.

The patent of Melker, et al (U.S. Pat. No. 7,755,494) and the patent of Smith (U.S. Pat. No. 7,597,122) monitor hand washing by the use of hand washing agents added to the soap or disinfectant, and therefore addresses a different issue than the current invention.

Johnson's patents (U.S. Pat. Nos. 6,970,574 and 7,542,586 and 6,038,331) and that of Plost (U.S. Pat. No. 8,294,584) and the application of Chen; Wen-Hui; et al. (20120140054) require a detailed hand examination unlike the present invention, The patent of Seyed Momen, et al. (U.S. Pat. No. 8,237,558) addresses hygiene requirements for users moving zone to zone and requires that they carry zone sensors, and therefore is not addressing the same issues in a similar manner as the current invention.

The patent of Mahmoodi, et al. (U.S. Pat. No. 8,299,896) requires a biometric sensor operatively coupled to the computer and a hand hygiene dispenser operatively coupled to the computer, neither of which is required in the current invention.

SUMMARY

A system is described for a providing a microprocessor-controlled camera system for monitoring of a wash station. A camera is focused on a wash station and evaluation of events at the station is provided by the sequential processor examination of areas of the image. Recognition of the initiation of an employee hand washing event is made by the processor recognizing in the image activity in one or more of the regions at the wash station that are indicative of the initiation of a wash event. Such locations would include, but are not limited to, the turning on of the water, the water flow under the faucet or the presence of motion in the vicinity of the soap or disinfection dispenser. Once the processor recognizes the initialization of a wash event the processor switches from examining the initiation area to examining the area in each picture that are indicative of the continuation of the wash event. Some areas indicative of the continuation of the wash event considered to continue while an examination of the washer's hands extend above the sink. A pictorial record is made of the hand washing sequence by recording a sequence of pictures, This sequence of pictures, together with additional information including, but not limited to, location, time and wash duration, and any employee information.

Advantages

The availability of a photographic record of every wash sequence allows management oversight in a time-effective manner by providing statistics of the time and duration of washing events, allows review with the employee to discuss improvement. Providing a sped-up display of any desired event reduces review time. Employees with improper hand washing technique can be detected and the visual display of the employee's performance can be used for employee training. The employee's knowledge of consistent monitoring will motivate compliance with good procedures.

The described system, by reducing the calculation involved in the review of images, allows implementation with inexpensive processors and cameras. The described system requires no modification to existing facilities and installation can be inconspicuous and quick.

FIGURES

FIG. 1 shows a flowchart of system operation.

DETAILED DESCRIPTION

The functions of this system are:
(1) the determination that an individual is present at a wash station performing a hand washing
(2) the recording of a series of images during the hand washing
(3) the determination that a hand washing has terminated
(4) the creation of a record of the sequence of images between the start and end of the hand washing, together with auxiliary information such as the time, duration, location and any employee information
(5) a means for the storing, retrieval, display and evaluation of the record in isolation and in conjunction with other records An image capturing means, such as a camera or a device for capturing holographic images, focused on a wash station can obtain a continuous stream of images. These images are fed to a processor or controller or PGA to which the camera is attached, which operates in the manner of a state machine to accomplish much of the above functionality. In the following discussion each image in the sequence of images is often referred to as a 'snap'. In order to reduce the processing power required to perform the required calculation and thereby the expense of the processing system, the processor can extracting from the image a small area of interest and evaluating only those pixels in the area of interest. The importance of the calculation limitation can be seen where demonstration systems operating at 800 MHz could successfully calculate in real time only a line of pixels 600 pixels long. A preferred method for the area selection is the selection of a line of pixels in the desired region. In this discussion when there is reference to pixels it is assumed that this can also refer to groupings of pixels obtained by data compression. For example if the picture is rendered in JPEG, rather than rendering the individual pixels from the JPEG representation, the native JPEG average over an 8×8 pixel block can be used. In a area of interest activity within that area is of interest and can be determined by comparing an image can to a more slowly varying background representing the state of the region from prior images. A preferred method is to simply use the weighted Y, U and V differences between one snap's area and those of the previous snap. This limits propagating disturbances through time. A typical webcam-type camera with VGA resolution can easily take 5 or 10 frames per second with sufficient resolution allowing evaluation of the changes in a 100 to 200 millisecond period. While this has been found to be a preferred method of image evaluation, the system has been operated by comparing the current image area to a more persistent background average from previous snaps. In comparing one snap's area to the same area in a previous snap, differences show the motion of a body, i.e. activity, within the area of interest. Since a proper hand washing involves vigorous agitation of the hands, field use of the system herein described has shown little problem with the detection of the washer's actions with a simple difference. The system is compatible with other methods of motion filtering such as edge detection or second derivative calculation. Another technique for demonstrating activity which has been employed is to freeze the image of region two or region two immediately prior snap when the first motion is detected in that region and for the duration of the washing event to compare the current image to detect motion. This has the advantage of detecting the presence of an arm that is stationary but the disadvantage that a new stationary object, such as an abandoned towel giving a continuous presence signal, requiring additional filtering. A combination of the above methods can also be used.

FIG. 1 shows the process flow which is described below. The hand washing system first looks for the initiation of the hand washing by the processor evaluation of an area indicative of wash initiation. The preferred method is to focus on the area under the faucet looking for water flow or hand motion to provide the detectable activity. Some of the other possible areas for the initiation of the hand washing are to focus on the faucet handle area where the water flow is turned on or the dispenser for the soap or disinfectant. The processor evaluation could focus on one such area or simultaneously on more than one such area. In any of these localized areas if activity is detected the system controller will recognize the initiation of a wash event and then shifts to analyzing the continuation of the wash event. A preferred such area indicative of the continuation of a wash event would be where the washer's arms enters the wash station since during a wash event the washer will keep his arms extended into the wash station area. Motion of the arms can be detected as described above and this will indicate the continuation of the wash event. Other areas indicative of the continuation of the wash event would include the continued presence of the washer next to the wash station, or the continued flow of the water. The controller will create a record of each hand washing event, which containing data pertinent to the hand washing event in a retrievable form, such as a database entry or an event-specific form such as a fixed-format file. The hand washing event record will contain the time at which the wash event initialized and will add periodic images to the wash event record and any other ongoing information deemed pertinent to the record. At the determination that there is no activity in the area indicative of the continuation of the wash event, the wash event is determined to have ended and the processor closes the wash event record and enters the wash time duration into the wash event. At this time any additional information such as the location and any external employee identification, such as a voice recording or RFID detection is entered into the record.

In some cases the wash station may be incorporated in a location where the employee reaches across the wash station area while performing acts unrelated to the hand washing. This would cause incorrect hand washing statistics. Such cases can be accommodated by including an optional third area that is examined during the wash event while the area covering the washer's arm motion is being evaluated. This third area could, for example, be the area behind the wash station into which an employee may reach while not performing a hand washing. If motion is detected in this third area the hand washing record is terminated and the record removed from further consideration.

In FIG. 1 note that customarily a camera determines the rate of image delivery and the process is similar to a state machine where depending on the state the image is input into the flow in one of two positions and the image is treated differently.

A useful feature in the system of hand washing monitoring described above would be the ability to identify the washer, If the washer had RFID identification, for instance, the presence of the RFID could be detected by the processor and added to the record of the wash, or a microphone could detect an audio statement by the washer identifying the washer and this could be added to the record of the wash, or the image could be examined for visual indicators such as an ID tag or the use of facial recognition or other biometrics.

Once the record of the hand washing event is made as described above the record is to be made available to users. This record can be retained for an indefinite period and could serve as evidence of good practices when compliance is questioned, This can be accomplished by physical removal of a record media or display on a web page served by the processor. A preferred method is to include in the processor function a means for the downloading of the record to a remote server. Because of the difficulty in conforming to unpredictable configuration of firewalls at various locations where this system could be employed, it is advantageous that the capability of downloading should include the capability of tunneling. This has the advantage of record integrity at a more secure location and the ability for further access and analysis by a more powerful machine. The statistics from related systems can be combined by the server, integration into user's reporting systems, the management of secure user access and the generation of report are functions are preferably done by a remote server. More computationally intensive calculations, such as those involved in facial recognition or voice recognition, can be performed in the remote server, offloading chores from the more limited processor in the hand washing system described above. The hand washing server system herein described could perform the functions described as server functions but the increased local system complexity would not be optimal. A feature of the presentation of wash event for review would be the presentation of a single image from all wash events for the period under review to allow further selection of any single wash event and the presentation of the single wash event sped up so that the observation of a 15 second wash could be accomplished in a fraction of that time.

While the above discussion relates to addressing the problem in restaurant food preparation, similar problems can be encountered elsewhere within the food industry and outside the food industry, for example, in food packaging, food processing and the preparation of sterile products. Hand washing hygiene is also an issue in providing medical services. The methods and apparatus described above should be considered in their wider applications.

We claim:

1. A method for creating an evidentiary record of a wash event, comprising
   a. providing a calculation means for acquiring a series of wash images and extracting from each image of said series of wash images one or more specified fixed first regions of each said image indicative of the initiation of a wash event and one or more fixed specified second regions, distinct from said first regions of each said image, indicative of the continuation of said wash event, and:
   b. providing a calculation means for detecting activity in said one or more specified first regions of each said image indicative of the initiation of a wash event thereby determining the initiation of said wash event, and
   c. providing a calculation means after said detection of said initiation of said wash event for detecting activity in said one or more said second regions indicative of the continuation of said wash event as a determination that said wash event has not ended and that said wash event is continuing, and
   d. providing a calculation means for creating a wash record of said wash event after said determination that said wash event has initiated and including in said record periodic images of said wash event and other useful wash event information while said wash event is determined to be continuing, and
   e. providing a calculation means for closing said wash record and reverting to step a above after said determination that said wash event is no longer continuing, and
   providing a means for storing and subsequent processing, displaying and combining of said wash records.

2. The method of creating an evidentiary record of a wash event of claim 1 further including providing a means of display of a selected representation from said sequence of images of said hand washing event at a faster rate than that at which said images were taken whereby the time required for the review of said hand washing events can be reduced.

3. The method of creating an evidentiary record of a wash event of claim 1 further including providing a calculation means of extracting from each image of said series of wash images one or more specified fixed third regions of each said image indicative of activity other than of a wash event and for deleting said record when activity is detected in said third regions.

4. The method of creating an evidentiary record of a wash event of claim 1 wherein said subsequent processing, displaying and combining of said wash records includes the storage in said wash record of information allowing the identification of the washer Said information could include, but is not limited to, washer RFID (Radio Frequency Identification) identification, recorded audio statements, or said image could be examined for visual indicators such as an ID tag or the use of facial recognition or other biometrics.

5. The method of creating an evidentiary record of a wash event of claim 1 wherein said subsequent processing, displaying and combining of said wash records includes the downloading of said wash records to a server for further processing in said server.

6. The method of creating an evidentiary record of a wash event of claim 5 wherein said downloading of said wash records to a server is accomplished by tunneling whereby tailoring to specific network firewalls is mitigated.

7. The method of creating an evidentiary record of a wash event of claim 1 wherein said one or more said specified first regions and one or more said specified second regions are lines of pixels or pixel groupings.

8. A machine for creating a record of hand washing events comprising a processor to which a stream of images from an image stream source are fed to perform the steps of:
   a. monitoring each image in said stream of images to detect activity in one or more specified first areas within an image that is indicative of the initiation of a hand washing event in order to determine the initiation of a hand washing event, and
   b. if said initiation of hand washing activity has been determined, to then monitoring each subsequent image in said stream of images to determine if one or more specified second areas, distinct from said first regions, within an image indicative of the continuation of a hand washing event to detect activity indicating the continuation of the hand washing event, and
   c. to create a hand washing record containing pertinent hand washing information including periodic hand washing images while said continuation of hand washing activity is determined, and
   d. when said continuation of said hand washing event is no longer determined, to close said hand washing record, and
   e. facilitate user access to said hand washing record and information derived from said hand washing record, such as wash duration, and
   f. to repeat the above sequence.

9. The machine for creating a record of hand washing events of claim 8 wherein said image stream capturing device is a camera.

10. The machine for creating a record of hand washing events of claim 8 wherein said monitoring to detect activity comprises exceeding a predetermined minimum difference between the pixel or pixel grouping in the current image and a predetermined function of pixels or pixel groupings from previous images for some function of the number of pixels or pixel groupings.

11. The machine for creating a record of hand washing events of claim 8 wherein said specified first areas and said specified second areas are one or more lines of pixels or pixel groupings.

12. The machine for creating a record of hand washing events of claim 8 further including the step of monitoring each image in said stream of images to detect activity in one or more specified third areas indicative of invalidity of said wash event during said determination of the continuation of a hand washing event, with said detection of activity in said third areas causing a failure to retain said hand washing record.

13. The machine for creating a record of hand washing events of claim 8 wherein said subsequent processing, displaying and combining of said wash records includes the storage in said wash record of information allowing the identification of the washer Said information could include, but is not limited to, washer RFID (Radio Frequency Identification Unit) identification, recorded audio statements, or said image could be examined for visual indicators such as an ID tag or the use of facial recognition or other biometrics.

14. The machine for creating a record of hand washing events of claim 8 wherein said facilitate user access to said hand washing record compromises downloading all or selected said records to a server capable of further access and manipulation of said records.

15. The machine for creating a record of hand washing events of claim 14 wherein said downloading of said wash records to a server is accomplished by tunneling whereby tailoring to specific network firewalls is mitigated.

16. The machine for creating a record of hand washing events of claim 8 wherein said facilitate user access to said hand washing record further compromises presentation of said periodic hand washing images in said hand washing record is presented at a rate faster than the original period between said periodic hand washing images in order to reduce viewing time.

* * * * *